March 3, 1970     R. B. CLARK     3,498,145
ERECTION SYSTEM FOR VERTICAL GYROS
Filed Nov. 2, 1966     2 Sheets-Sheet 1
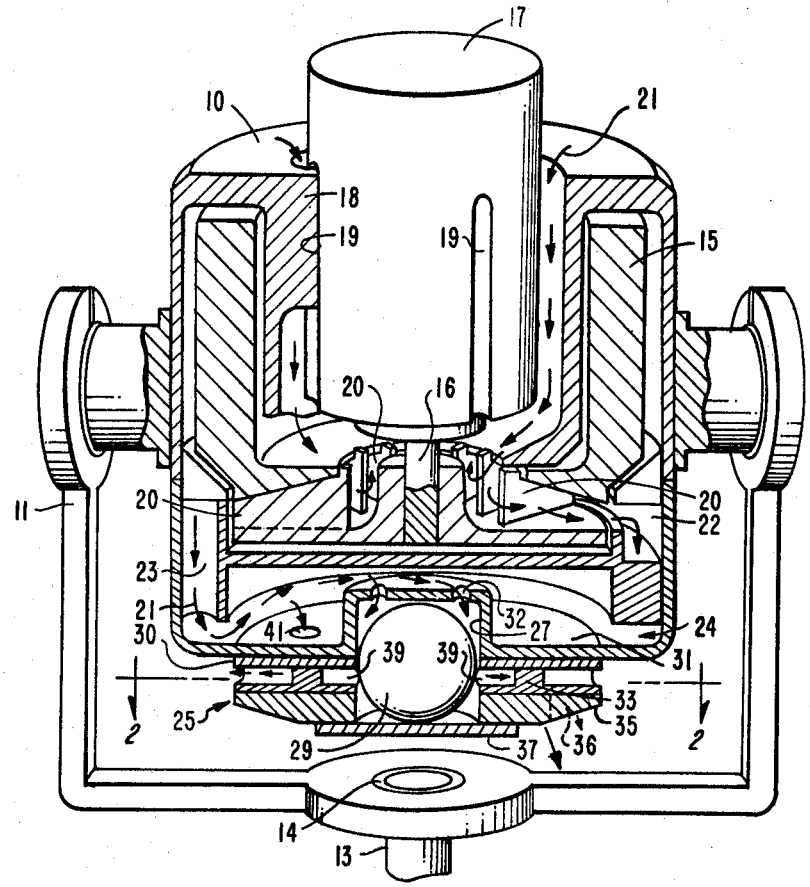
FIG.—1
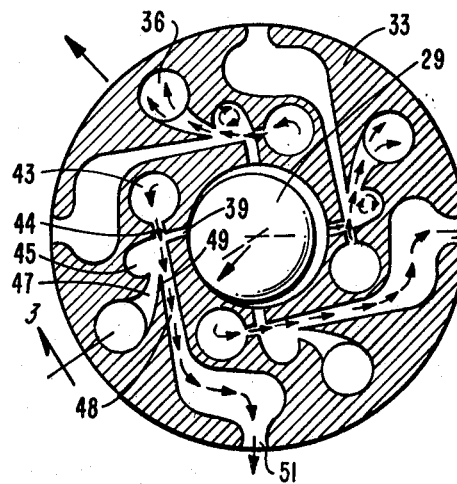
FIG.—2
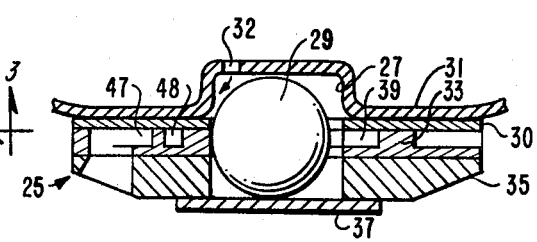
FIG.—3
INVENTOR.
RICHARD B. CLARK
BY *Fraser and Bogucki*
ATTORNEYS March 3, 1970  R. B. CLARK  3,498,145
ERECTION SYSTEM FOR VERTICAL GYROS
Filed Nov. 2, 1966  2 Sheets-Sheet 2
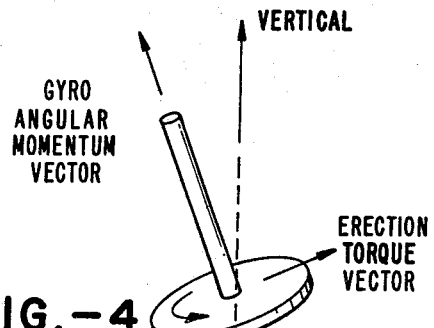
FIG.-4
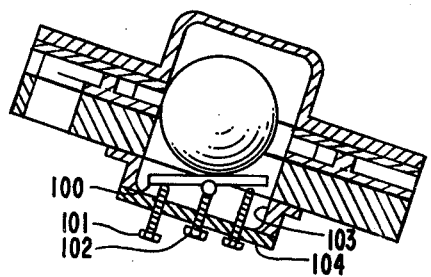
FIG.-5
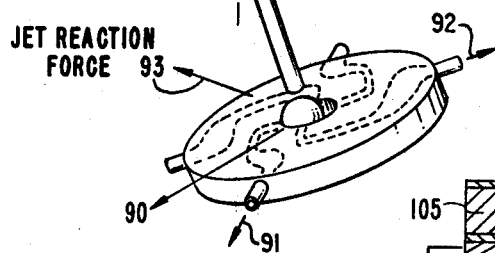
FIG.-8
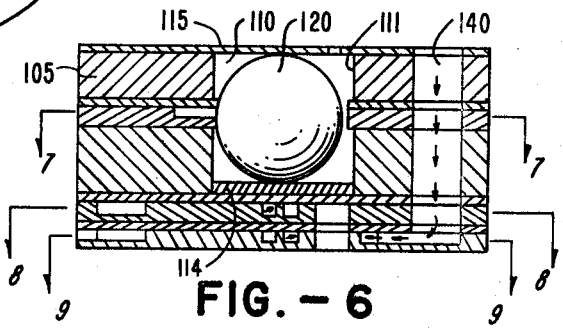
FIG.-6
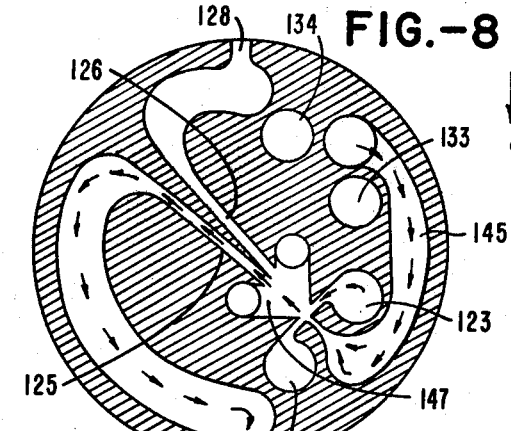
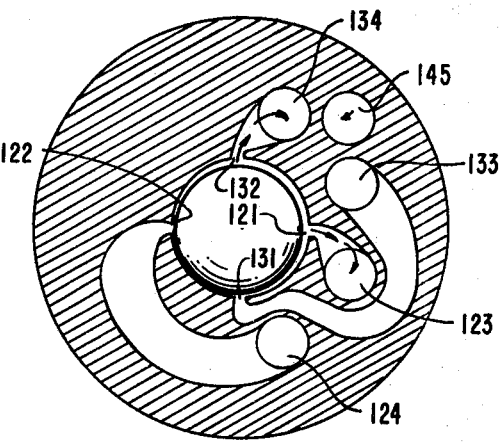
FIG.-7
FIG.-9
INVENTOR.
RICHARD B. CLARK
BY Fraser and Bogucki
ATTORNEYS

United States Patent Office 3,498,145
Patented Mar. 3, 1970

3,498,145
ERECTION SYSTEM FOR VERTICAL GYROS
Richard B. Clark, Granada Hills, Calif., assignor to Whittaker Corporation, Los Angeles, Calif., a corporation of California
Filed Nov. 2, 1966, Ser. No. 591,586
Int. Cl. G01c 19/30
U.S. Cl. 74—5.43                                    17 Claims

ABSTRACT OF THE DISCLOSURE

A gyro erection control mechanism is disclosed for producing an erecting torque on the gyro in response to minute displacements of a spherical control element resulting from tilting of the gyro. The control element regulates the flow of control streams in fluid amplifiers whose power streams are thereby directed as required to apply a large restoring torque to the gyro.

---

This invention relates to mechanisms for providing a sensitive mechanical response to a physical displacement, and more particularly to mechanisms for erecting or aligning the axes of gyros or other instruments with respect to the direction of gravity.

The purpose and importance of gyros and similar instruments are well known. They provide an important function in the instrumentation of airplanes, naval guns, or other maneuverable machines where detection of a precise orientation is required. The basis of gyro operation is the conservation of angular momentum. If a gyro is placed in a two degree of freedom gimbal system, for example, conservation of angular momentum will theoretically keep the gyro orientation fixed, thus permitting detection of the orientation of the system. In practice, however, various error torques will precess the spin axis of the gyro from its desired direction. In light of the function of the gyro, it is important to provide a mechanism for erecting the gyro to align and realign its spin axis in the desired direction.

In the prior art, several techniques have been used for erecting gyros, including some in which the means for generating erection torques involve air jets or applied air pressure. Several types of control elements, displaceable in response to gravity, have been used in such prior art systems. Pendulums have been employed which open and close air valves. Rolling spheres have been used which are connected in some fashion to shutters or pistons that control air streams. Such devices, however, are generally excessively large or not sufficiently sensitive for modern applications.

Amplification of forces in sensitive gyro erection and alignment systems is necessary since the sensitive control element must be capable of detecting very small changes in the alignment of the spin axis by undergoing a very small displacement under light forces and yet be able to create a sufficiently large torquing force to realign the gyro at an erection rate which must always exceed the drift rate of the gyro. In providing the necessary force amplification, the prior art has encountered several difficulties. The use of large pendulums or moving double pistons results in significant mass unbalances which tend to degrade precision and sensitivity. Typically, after erecting the gyro, the device must then operate to correct a misalignment due to the large mass unbalance. Such a technique leads to a searching oscillation and limits precision and sensitivity. Moreover, the use of moving parts, such as pistons, results in friction which limits the sensitivity and speed of response.

Other gyro erection systems employ pistons in air-tight cylinders and pendulums to close and open air valves which are used to generate the erecting torques. In such systems, many close tolerances are necessary between the various moving parts, and such systems are thus relatively expensive to manufacture and difficult to maintain and tend to be less reliable than those of simpler construction.

It is therefore a principal object of the present invention to provide a system which applies a large controlled force in response to a small displacement of a sensitive control member.

It is a further object of the present invention to provide a more accurate, reliable, faster reacting, and inexpensive erection system for vertical gyros.

It is still a further object of the present invention to provide a more accurate, reliable, faster reacting, and inexpensive mechanism for aligning a gyro spin axis at a desired inclination relative to gravity.

Yet a further object of the present invention is to provide a more sensitive system for controlling the orientation of any device or instrument.

The present invention provides a gyro erection control mechanism for activating a substantial erecting torque on a gyro in response to the slight displacement of a control member by utilizing pneumatic amplifiers. A pneumatic amplifier is, as is well known, a device which without the use of mechanical or electrical elements directs a high pressure power stream under control of a much smaller intersecting stream which deflects it into alternate outlet channels. A sensitive control member is employed which by a small displacement in response to a force field or other actuating condition opens or closes the control stream channel to deflect the power stream into a different outlet channel and apply a relatively large force or torque at some desired point.

A particular example of the present invention is an erection system for vertical gyros in which the sensitive control element is a hard sphere rolling on a horizontal base surface within a cylindrical chamber which is of slightly larger dimensions than the sphere. Small outlet ports are disposed at various positions in the cylindrical wall of the chamber and these outlet ports lead to the control jets of a system of pneumatic amplifiers which are disposed about the chamber. Each pneumatic amplifier includes an inlet source for the power stream, an inlet channel leading from the source to a splitter, a control jet substantially normal to the inlet channel, and two outlet channels which proceed from the splitter. The primary outlet channel leads to a torquing jet arranged to create torque about a sensitive axis of the gyro, and the alternate outlet channel leads to a dissipative outlet that introduces a negligible torque on the axis of the gyro. If the control jet is on, the power stream is deflected into the alternate channel and out the dissipative outlet. If the control jet is turned off, however, the power stream then flows into the primary outlet channel to the torquing jet and applies a torque on the axis of the gyro.

A pressure differential is maintained in the air inlets and outlets to sustain the power and control streams. When the gyro spin axis is properly erected, the control sphere rolls freely on the horizontal base surface of the chamber. When the control sphere is at the center, all of the outlet ports in the cylindrical wall of the chamber are open so that the pressure in the chamber forces air through all the outlet ports and into the control jets of the pneumatic amplifiers. Thus, all of the power streams of the system of pneumatic amplifiers flows to the dissipative fluid outlets, and no torque is created on the axis of the gyro. Actually, the free rolling sphere may only be momentarily centered in its random movement between the small outlet ports spending on the average the same amount of time at each. If, on the other hand, the spin axis of the gyro is tilted, the sphere is displaced along the horizontal base surface in the direction of tilt, remaining on one side of the cylindrical wall where the surface of the sphere blocks or partially blocks the outlet ports in that section of the wall. The control jets of the pneumatic amplifiers associated with these outlet ports are then turned off or reduced in force so that all or a portion of the power streams in these pneumatic amplifiers flow into the torquing jets on one side to create a net torque in a direction to realign the spin axis of the gyro.

Several advantages are inherent in the gyro erection system described. The device is highly sensitive, because the sphere need roll only a short distance to activate the torquing jet. For this same reason, significant mass unbalances are eliminated. Moreover, the inherently simple construction involving only one moving part and few close tolerances provide greater reliability and lower cost. Also, the mechanism can be employed to align the gyro spin axis at any desired inclination simply by adjusting the plane of the base surface upon which the control sphere rolls to make the desired angle with the gyro spin axis.

A better understanding of the invention may be had by reference to the following detailed description, taken in conjunction with the accompanying drawings, in which:

FIG. 1 is a partial sectional view of a gyro and erection system in accordance with the invention;

FIG. 2 is a plan sectional view of a gyro erection system in accordance with the invention taken along the lines 2—2 of FIG. 1;

FIG. 3 is a side sectional view of the erection system taken along the lines 3—3 of FIG. 2;

FIG. 4 is an idealized perspective representation useful in explaining the erection dynamics of a gyro in accordance with the invention;

FIG. 5 is a side sectional view of an alternative exemplification of the invention showing an adjustable device for aligning the spin axis of a gyro at a desired inclination;

FIG. 6 is a side sectional view of a different type of erection system in accordance with the invention; and FIGS. 7, 8 and 9 are plan sectional views taken along the lines 7—7, 8—8 and 9—9, respectively, of FIG. 6.

Referring now to FIG. 1, a preferred embodiment of a gyro system in accordance with the present invention is shown for erecting a gyroscope to align its spin axis vertically with the gravitational force. A gyroscope is contained within a housing 10 which is mounted in a conventional two degree of freedom gimbal arrangement comprising a yoke-shaped outer gimball 11 rotatably journaled on a shaft 13 by means of a bearing 14. The gyroscope includes a rotor 15 mounted for high speed rotation on a spin axle 16 by an electrical spin motor 17. As shown in FIG. 1, the spin motor 17 is preferably mounted within a recess provided in the top of the gyroscope housing 10 in such a way as to permit the passage of air around the motor casing downward into a space surrounding the spin axle 16, as shown by the arrows 21. To accomplish this, the housing 10 is formed with a plurality, in this case three, ridges 18 equally spaced around the periphery of the recess and extending inwardly to engage vertical grooves 19 formed in the spin motor casing, thus rigidly holding the motor 17 in position at the center of the recess to permit air flow through the annular passage defined between the outer surface of the motor casing and inner cylindrical surfaces of the recess.

For ease of illustration, the gyroscope is shown in FIG. 1 with its spin axis substantially parallel to the axis of the outer gimbal 11. However, as those skilled in the art will recognize, operation of the gyroscope in this position would give rise to a destructive tumbling condition in which the outer gimbal 11 would pick up momentum from the spin motor 17 causing the whole gimbal system to rotate. Therefore, in actual operation, a definite angle should be maintained between the axes of the spin axle 16 and the shaft 13.

The lower portion of the rotor 15 constitutes the impeller wheel of a centrifugal air compressor. Individual impeller blades 20 are formed integrally in the bottom portion of the rotor 15 to rotate at the rotor speed. A continuous flow of air (as shown by the arrows 21) is drawn into the recess in the housing 10 past the spin motor casing to enter the spaces between the rotating impeller blades 20. This air flow serves the dual purpose of providing the input flow to the compressor and of cooling the electric motor 17. Air expelled from the rotating impeller blades enters an annular passage 22 formed in the housing adjacent the rotating blade tips to emerge under pressure as shown by the arrows 21 through an outlet port 23 into a hollow enclosure 24 formed in the lower portion of the housing 10.

An erection control mechanism 25 is attached to the bottom of the gyroscope housing 10 and consists of an annular block assembly that defines a right cylindrical chamber 27, in which a control sphere 29 is disposed. The block assembly is preferably of a layered construction with the bottom of the housing 10 itself forming one of the layers. A cover member 31, which in this case is formed as an integral part of the bottom of the housing 10, has a central perforated cap portion overlying the top of the cylindrical chamber 27, which serves to confine the control sphere 29 within the chamber while permitting a flow of compressed air through holes 32 into the cylindrical chamber. A disk-shaped spacer layer 30 is attached beneath the bottom of the housing 10 and has openings corresponding to openings 27 and 41. A pattern of channels is cut in the upper surface of a lower layer 33 to define a pneumatic amplifier system, as hereinafter more fully explained in connection with FIG. 2. The layers 30 and 33 are normally sealed together prior to being attached with the other mechanism to permit independent testing of the pneumatic amplifier operation prior to assembly. Both layers are preferably fabricated of glass with the channels and holes etched into their surfaces. Vertical outlet apertures 36 extend through a bottom layer 35 to communicate with certain pneumatic amplifier outlet channels in the layer 33 to serve as dissipative outlets for the pneumatic amplifiers.

The control sphere 29 has a selected diameter slightly less than the internal diameter of the cylindrical chamber 27 and rests on the flat upper surface of the disk 37. The control sphere 29 is thus free to roll toward any point around the circumference of the inner wall of the chamber 27. The size of the control sphere relative to the inner diameter of the chamber 27 is such that its spherical surface is capable of blocking or partially blocking the flow of air from the chamber into one or more small outlet ports 39 located on the side of the chamber 27 toward which the sphere is displaced, while permitting the free flow of air through the other outlet ports 39 on the opposite side of the chamber. The small holes 32 in the raised cap portion of the cover are preferably made small enough to restrict the flow of air into the cylindrical chamber 27 so that the chamber pressure is slightly lower than the pressure within the surrounding enclosure 24.

Referring now to FIG. 2, the pattern of channels cut in the layer 33 form four separate fluid amplifiers. Pressurized air from the enclosure 24 enters each amplifier through an associated inlet port 41 that extends through the flat outer portion of the cap member 31 and the underlying spacer layer 30 where it flows through a restricted inlet channel 44 to form a high speed power stream that is directed through a control region 45. Air at a slightly lower pressure entering through the small outlet ports 39 is directed as a control stream into the control region 45 to intersect the power stream at substantially right angles. The air entering the control region 45 exits through either of two outlet channels 47 or 48 which are separated at their juncture by a splitter or divider section 49. The primary channel 48 proceeds in the same direction as the inlet channel 44 past the splitter 49, and then leads toward a nozzle outlet 51 formed at the periphery of the layer 33. The nozzle outlet 51 for each amplifier is displaced at an angle of ninety degrees in the direction of rotation of the rotor from the respective outlet port 39 within the chamber 27. The alternate channel 47 curves off in the direction of the control stream on the side of the splitter 49 and leads outward to one of the vertical apertures 36. If the air flow of the control stream is blocked by the presence of the control sphere 29 against the small outlet port 39, the power stream flows in a straight line through the control region 45 and past the splitter 49 into the primary outlet channel 48 so that the entire air flow in the power stream emerges in a jet through the nozzle outlet 51. On the other hand, when air flow in the control stream is not blocked, it collides with the power stream in the control region 45 causing all or a portion of the power stream to be deflected to the other side of the splitter 49, and thus through the alternate channel 47 to the vertical outlet aperture 36. Subsequently, should flow in the control stream again be blocked, the power stream again flows into the primary outlet channel 48.

In operation, the spin motor 17 rotates the gyro rotor 15 on the spin axle 16 at high speed. The vanes 20 on the rotor 15 also rotate to provide a continuous supply of compressed air within the enclosure 24 for operation of the pneumatic amplifiers. When the spin axis of the gyro is vertically aligned with the gravitational field, the control sphere 29 rolls freely around on the flat upper surface of the base member 37. Assuming for the purposes of illustration that the control sphere 29 is centered within the cylindrical chamber 27 equidistant from each of the small outlet ports 39, an equal flow of pressurized air will flow in the control stream of each of the four pneumatic amplifiers to deflect the power streams into the alternative outlet channel 47 to be dissipated through the holes 36. The flow of air through the holes 36 is relatively slow and thus produces only a negligible reaction force on the gyro. Moreover, the air is expelled from the holes 36 in a direction so as to intersect or nearly intersect the gimbal axes of the gyro so that what little reaction force might be created results in little torque about the gyro spin axis. On the other hand, when the control sphere 29 is displaced from the center of the cylindrical chamber 27 to block one of the small outlet ports 39, so that air flow in the control stream ceases or is substantially reduced, the power streams are not deflected to the alternate outlet channel 47 and instead flow in the primary outlet channel 48 to the nozzle outlet 51. The high speed flow of air through the nozzle outlet 51 operates as a torquing jet to produce a substantial reaction force in a direction normal to the spin axis of the gyro. At the same time, the continued control stream flow through the small outlet ports 39 on the side of the cylinder opposite the direction in which the sphere 29 is displaced deflects the power stream to the dissipative outlet holes 36 so that the existence of the torquing jet on one side and not on the other produces a substantial net torque on the gyro axis in a direction ninety degrees displaced from the point at which the control sphere 29 is in contact with the cylinder walls. The resulting torque continues as long as the control sphere 29 remains in this position within the cylinder 27. Thus, if the control sphere 29 is displaced to one side due to tilt of the gyro spin axis, it remains against the low side of the cylinder 27 until the gyro is again properly aligned, and the resulting jet reaction force applied normal to the direction of tilt provides a torque for erecting the gyro on a substantially direct path.

Actually, when the gyro axis is properly aligned with the vertical, the control sphere 29 rolls freely within the chamber 27 moving randomly from side to side around the periphery of the chamber 27, momentarily blocking and then unblocking each of the small outlet ports 39.

The random movement of the control sphere 29 in this manner, though producing momentary torques on the gyro axis, is averaged over a period of time so that no net torque on the gyro is produced. However, when the gyro axis is tilted from the desired alignment, the control sphere 29 remains against one side of the cylinder 27 to generate a continuing erecting torque.

Referring now to the schematic illustration of FIG. 4, the operation of the system in accordance with this invention is better understood by considering a typical sequence of events involved in aligning the gyro spin axis from a tilted position. As shown, the gyro spin axis is tilted in an arbitrary direction 90 to a position several degrees from the vertical, thus resulting in the control sphere being displaced in the direction of tilt to occupy a position against the sde walls of the cylinder 27 between two adjacent small outlet ports 39 in the cylinder wall where it wholly or partially blocks the flow of pressurized air in the associated control streams. The torquing jets 91 and 92 create a net reaction force in a direction 93 which is at a ninety degree angle from the tilt direction 90 so as to produce an erecting torque, which by the right-hand rule will precess the gyro spin axis in a substantially direct path towards the vertical.

Alternatively, the gyro erection system of this invention can easily be modified to align the gyro spin axis at any desired inclination to the vertical merely by proper orientation of the base member. For example, referring now to FIG. 5, a flat base member 100 is made adjustable with respect to the gyro axis by use of positioning screws 101 to provide a desired angle of tilt. In this arrangement, the center of the adjustable base member 100 is rotably mounted by a fixed ball joint 102. The lower end of the cylindrical chamber 103, which is extended below the base member 100 to permit tilting, is sealed by the disk member 104 to maintain pressure in the chamber. Alternatively, the spin axis of the gyro may be selectively chosen relative to the vertical by making the entire chamber adjustable, or making the orientation of the entire erection control system adjustable relative to the housing 10.

The exact pattern or configuration of the pneumatic amplifier system need not, of course, conform to the simple example displayed in FIG. 2. FIGS. 6, 7, 8 and 9 represent a more complex configuration of pneumatic amplifiers in accordance with the invention. The device of FIG. 6 has an annular block 105 containing three operational planes instead of one. As in the previous example, a chamber 110 is defined by the inner surfaces of the annular block 105, a base surface 114 and a cap 115. A sphere 120 is again disposed within the chamber free to roll along the base surface 114, and the surface of this sphere 120 is again capable of opening or blocking small apertures 121, 122, 131 and 132 in the cylindrical surface 111 of the chamber. Control channels 123, 124, 133, 134 which open at one end to the cylindrical chamber through the small apertures 121, 122, 131 and 132 respectively are cut in the plane containing the control channels shown in FIG. 7. The primary channels of the pneumatic amplifiers lie in two planes (separately shown in FIG. 8 and FIG. 9) and consist of twin primary channels 125, 126 and 135, 136 leading to torquing jets facing in the opposite directions 127, 128, 137, 138. The power stream is transmitted through a source channel 140 which passes vertically through the annular block 130 and arrives at the source 145 of each amplifier. The control channels 123, 124, 133, 134 intersect the power stream in opposing pairs at the regions 147 of each amplifier. As can be readily seen from FIGS. 6–9, the control streams arriving at opposing control channel outlets in the splitting region 147 originate from apertures in the cylindrical wall 111 which are disposed on opposite sides of the chamber, such as the pairs 121, 122 which lead to the control outlets 123, 124 in the upper amplifier plane or the pair 131, 132 which lead to the control pair 133, 134 in the lower amplifier plane.

This form of the invention is more complex but extremely sensitive. A very slight displacement of the sphere 120 in the chamber results in unequal amounts of air flowing into a pair of small apertures such as the pair 121, 122 or the pair 131, 132. Unequal amounts of air are therefore delivered at one side of a pair of opposing control channel outlets such as the pair 123, 124 or 133, 134. The power stream, entering at the source 145 in each amplifier and passing the opposing control jets, is deflected into one or the other of the twin primary channels 125, 126 or 135, 136 by a very slight unbalance in the thrust of the opposing control jets in a control jet pair. This results in the power stream flowing out the appropriate torquing jets 127, 128, 137, 138.

Many other designs of pneumatic amplifiers may be used and still be within the scope of the invention. Other operating fluids besides air may also be employed. Furthermore, other designs for the control element, which has been a sphere in the examples illustrated, may be used. Moreover, it is clear that this device may be adapted to align other instruments than the gyro and still be within the scope of the invention. A particular feature is the use of a sensitive control member which by a slight displacement and an exercise of a slight force controls a small control stream which by deflection controls the output of a large power stream capable of exercising a substantial force. Such a device may be used for any number of displacement sensing instruments.

Several advantages are evident if the invention is adapted for aligning or erecting the gyro. Because the displacement of the sphere or other control member is small, significant mass unbalances are eliminated. The needed amplification of forces for erecting the gyro is performed by the pneumatic amplifiers. The pneumatic amplifiers provide a superior means of force amplification because they have no moving parts and are therefore more reliable and less costly.

It has been found that pressures of the order of 0.1 p.s.i. for the chamber and 1.0 p.s.i. for the power stream are desirable for a normal aircraft instrumentation gyro spinning at between 11,000 and 14,000 r.p.m. Such pressures produce erecting torques of approximately two degrees per minute. This amount of erecting torque is desirable because it exceeds the drift rate of aircraft gyros, but is slow enough to avoid significant turn errors. In other words, an aircraft turn taking one minute results in a turn error in the gyro of no more than two degrees, after which, of course, the erection mechanism realigns the gyro. The low pressure in the chamber results in a minimum suction effect against the control sphere when its surface is blocking one of the small outlet ports. It has been found that the control sphere can be made massive enough to overcome any suction at a tilt in the erection system of 0.1 degree without producing significant mass unbalances in the system.

The above specifications of pressure and torque are, of course, in no way meant to limit the scope of the invention, but serve only to better describe the construction and operation of the device.

What is claimed is:

1. A gyro erection system comprising: a control member responsive to accelerational forces for being displaced relative to the spin axis of the gyro; a system of pneumatic amplifiers disposed about the control member, each of said pneumatic amplifiers having a control stream and a power stream and alternate outlet channels for said power stream, said power stream being directed through said alternate output channels in accordance with the flow in said control stream; and means coupled to at least one of said output channels of each of said pneumatic amplifiers for conducting the flow of said power stream therethrough to produce an erection torque on said gyro, the flow in said control stream being controlled by the position of said control member relative to the gyro spin axis.

2. The gyro erection system of claim 1 wherein: said system of pneumatic amplifiers further includes an inlet for the control stream adjacent said control member, said control member being operative to be displaced toward said control stream inlet to block the flow of said control stream, said control stream inlets for each of said pneumatic amplifier being disposed symmetrically in different angular positions relative to said control member in a plane normal to the spin axis of the gyro; and said flow conducting means for each said pneumatic amplifier being disposed with a predetermined angular displacement at 90° in a plane normal to the spin axis of the gyro from the angular position of the inlet for associated control stream to produce an erection torque for erecting said gyro on a substantially direct path.

3. A gyro erection system comprising: a pneumatic torquing means coupled to the gyro for selectively generating a torque on the spin axis of the gyro; a movable control member; a system of pneumatic amplifiers disposed about the control member, the control being changeable in position relative to the system of pneumatic amplifiers in response to accelerational forces, each pneumatic amplifier of the system including at least one outlet channel coupled to operate the pneumatic torquing means, at least one alternate outlet channel, and a pneumatic control means for selectively directing a pneumatic flow into said outlet channels, said control member being operatively associated with said pneumatic control means in said system of pneumatic amplifiers for controlling the pneumatic flow to operate said torquing means in accordance with the position of said control member.

4. The gyro erection system of claim 3 wherein: each pneumatic amplifier of said system includes a dissipative pneumatic outlet coupled to said alternate outlet channel for dissipating pneumatic flow therein without producing a substantial torque on the spin axis of the gyro; said pneumatic control means includes a pneumatic control stream that intersects said pneumatic flow to deflect it to one of said outlet channels, said control member being operative to selectively interrupt said pneumatic control stream in certain of said pneumatic amplifiers in accordance with its position.

5. The gyro erection system of claim 4 wherein: said pneumatic control means further includes means providing a pneumatic power stream directed towards said one outlet channel which is coupled with said torquing means, and said control stream intersects said power stream to deflect it into said alternate outlet channel; and said control means is a single movable member responsive to accelerational forces to block the flow in the control stream of certain of said pneumatic amplifiers in accordance with its position.

6. The gyro erection system of claim 5 wherein: said torquing means associated with each pneumatic amplifier includes means for producing a pneumatic reaction force with a component normal to the gyro spin axis and disposed at a predetermined angular displacement in a plane normal to the gyro spin axis with respect to the angular position, of said single movable member at which it blocks the flow in the associated control stream.

7. The gyro erection system of claim 6 wherein: the pneumatic reaction force is directed substantially normal to the gyro spin axis; said angular displacement is approximately 90°; and said single movable member moves in a direction corresponding to the direction of tilt of the gyro spin axis from a predetermined alignment with respect to the direction of the accelerational forces.

8. The gyro erection system of claim 3 wherein: said control member constitutes a sphere; said system of pneumatic amplifiers includes a hollow block member defining a cylindrical chamber with its longitudinal axis aligned with the gyro spin axis and having a flat base surface at the lower end of said cylindrical chamber; said sphere is disposed for rolling movement on said flat surface within said cylindrical chamber; said pneumatic amplifiers consist of channels defined in said hollow block member, said pneumatic control means having a small pneumatic control channel with an inlet disposed within said cylindrical chamber in a position to be selectively blocked by the surface of said sphere; and said pneumatic torquing means are disposed at different positions around the outer surface of said block member.

9. The gyro system of claim 8 further comprising: means for adjusting the angle between said flat base surface and the gyro spin axis.

10. A gyro erection system comprising: a hollow enclosure defining a cylindrical chamber with its longitudinal axis aligned with the gyro spin axis; a plurality of pneumatic jets symmetrically disposed about and directed perpendicular to the spin axis of the gyro; a fluid pressure source, a plurality of primary conduits connecting said pneumatic jets and said fluid pressure source; a pluraliy of secondary conduits intersecting each primary conduit to provide a fluid flow for controlling fluid flow in said primary conduits and having an inlet aperture disposed within said hollow cylindrical enclosure communicating with said pressure source; and a displaceable control element of slightly smaller size than and having a similar cross-sectional configuration as the interior of said hollow enclosure disposed within said hollow enclosure, said element being movable in response to the tilting of the gyro spin axis to block said inlet aperture for selected ones of said plurality of secondary conduits.

11. A gyro erection system for vertically aligning the spin axis of a gyro comprising: a hollow member defining a right cylindrical chamber, the chamber having its longitudinal axis aligned with the gyro spin axis, a flat base surface perpendicular to the gyro spin axis, cylindrical side walls parallel to the gyro spin axis, and a predetermined internal diameter; a control sphere with a selected diameter slightly less than the chamber diameter disposed for rolling movement upon the base surface within the chamber, said control sphere being movable in response to accelerational forces along said base surface within said chamber; a plurality of outlet ports symmetrically disposed in the cylindrical wall of the chamber in the plane of the center of the control sphere, each outlet port being substantially smaller than the diameter of the sphere such that the surface of the control sphere can substantially impede the passage of the air therethrough when the control sphere is displaced against the side wall adjacent the outlet port; an annular block disposed about the chamber in the plane of the center of the sphere and the outlet ports, having an outer cylindrical surface parallel and adjacent to the cylindrical wall of the chamber, and top and bottom annular base surfaces perpendicular to the gyro spin axis; a plurality of torquing jets formed in the outer cylindrical wall of said annular block symmetrically about its periphery and directed perpendicular to the gyro spin axis; a plurality of dissipative outlets symmetrically disposed about the bottom annular base surface of said annular block and directed so as to intersect or nearly intersect the sensitive axes of the gyro; a plurality of pneumatic amplifiers disposed within said annular block, each amplifier including a source, a splitter, an inlet channel, a primary outlet channel, an alternate outlet channel, a control channel, a power stream, and a control stream, the inlet channel being disposed between and connecting the source and the splitter, the primary outlet channel being disposed between and connecting the splitter to a respective one of said torquing jets, the alternate outlet channel being disposed between and connecting the splitter and one of said dissipative outlets, the control channel being disposd between and connecting said inlet channel and a respective one of said outlet ports in the chamber wall, the power stream flowing from the source through the inlet channel to the splitter and then out either the primary outlet channel or the alternate outlet channel, and the control stream flowing in said control channel to intersect the power stream deflecting it from said primary outlet channel to said alternate outlet channel; means for providing pressure to maintain said power stream and for providing pressure in said chamber, such that a slight deviation of the gyro spin axis from the direction of gravity tilts the erection system and displaces the control sphere to one side of the chamber where its surface substantially blocks at least one outlet port on that side of the chamber to block the flow of the associated control stream, thus permitting the power stream in those amplifiers normally deflected into the alternate dissipative outlet when the control jet is on to flow out the primary outlet channel to the torquing jet and create an erecting torque on the gyro spin axis.

12. The gyro erection system of claim 11 wherein: each of said torquing jets is angularly displaced in a plane normal to the gyro spin axis approximately 90° from the angular position of the associated outlet ports in the cylindrical walls of the chamber, whereby said torquing jets produce an erecting torque for realigning the gyro spin axis along a substantially direct path.

13. A gyro system comprising: a gyro with a spin axis; a housing member disposed about the gyro; means for suspending the gyro to permit at least two degrees of freedom in the orientation of the gyro spin axis relative to the housing member, said means including an inner gimbal disposed about the rotor and affixed to the spin axle in two places on the spin axle so as to move in fixed relation with the orientation of the gyro spin axis; a hollow member affixed to said inner gimbal defining a right cylindrical chamber therein, the chamber having a central axis aligned with the gyro spin axis, a base surface perpendicular to the gyro spin axis, a cylindrical sidewall parallel to the gyro spin axis, and a predetermined internal diameter; a control sphere with a selected diameter slightly less than the chamber diameter disposed upon the base surface within the chamber, said control sphere being movable over the base surface in response to accelerational forces within said chamber; a plurality of outlet ports symmetrically disposed in the cylindrical wall of the chamber in the plane of the center of the control sphere, the diameter of each outlet port being substantially less than the diameter of the control sphere, such that the surface of the control sphere can substantially block the passage of air through an outlet port when the control sphere is positioned against the side wall of the chamber at the outlet port; an annular block disposed about the chamber in the plane of the center of the sphere and the outlet ports, said block having an outer surface parallel to the gyro spin axis; a plurality of torquing jets directed perpendicular to the gyro spin axis and symmetrically disposed around the outer wall of said annular block; a plurality of dissipative outlets symmetrically disposed around said spin axis in the bottom of said annular block; a plurality of pneumatic amplifiers disposed within said annular block, each amplifier including a source, an inlet channel, a control region, a primary outlet channel, an alternate outlet channel, a splitter separating said primary and alternate outlet channels, a control channel, a power stream and a control stream, the inlet channel being disposed between and connecting the source and the control region, the primary outlet channel being disposed between and connecting said control region to one of said torquing jets, the alternate outlet channel being disposed between and connecting the control region and one of said dissipative outlets, the control channel being disposed between and connecting the control region and one of the outlet ports in the chamber wall, the power stream flowing from the source through the control region to the splitter and then through either the primary outlet channel or the alternate outlet channel, and the control stream flowing from the chamber through the control channel to collide with the power stream in said control region to deflect it toward said alternate outlet channel; a centrifugal pumping element affixed to the spin axle of the gyro; motor means for spinning the gyro rotor and the centrifugal pumping element about the spin axis; and aperture means for conducting pressurized air from said centrifugal pumping element to said source of each of the pneumatic amplifiers to said chamber, whereby a slight tilt of the gyro spin axis from a predetermined alignment with the vertical causes said control sphere to be displaced to one side of the chamber where its surface substantially blocks the outlet port or ports on that side of the chamber, impeding the associated control streams to permit the power streams to flow out the primary outlet channel to the torquing jets to create an erecting torque on the gyro, thus maintaining said predetermined vertical alignment of the gyro spin axis.

14. A gyro system comprising: a gyro assembly; a hollow enclosure mounted for movement with said gyro assembly; a plurality of apertures disposed around the interior surface of the hollow enclosure; a movable control member disposed within the hollow enclosure; a plurality of pneumatic jets disposed about the hollow enclosure, and means defining a plurality of fluid conduits disposed about said hollow enclosure including a plurality of relatively larger conduits coupled to said pneumatic jets and a plurality of smaller conduits connected to said apertures in the hollow enclosure intersecting said larger conduits to provide a fluid flow for controlling the flow of fluid in said larger conduits.

15. A mechanism for maintaining the orientation of a device comprising: a hollow enclosure affixed to the device or instrument; a plurality of apertures around the interior surface of said hollow enclosure, a displaceable object disposed within the hollow enclosure with position changeable relative to the hollow enclosure; a control member disposed about the hollow enclosure; a plurality of pneumatic jets disposed around the outer periphery of the control member for generating a torque on said device, said control member having means defining a plurality of fluid conduits disposed including a plurality of large conduits connected to said pneumatic jets and a plurality of small conduits connected to said apertures in the hollow enclosure intersecting said large conduits to provide a control flow for controlling the flow in said large conduits.

16. The mechanism as claimed in claim 15, where the control member containing the fluid conduits and the hollow enclosure are spaced apart from each other.

17. A displacement responsive device comprising: a hollow enclosure member defining a chamber therein; a control member disposed within the chamber movable in response to gravitational forces relative to the chamber, a plurality of outlet ports disposed around the interior walls of the chamber, the surface area of the control member being substantially greater than the cross-sectional area of any of the outlet ports, such that the surface of the control member can substantially impede the passage of fluid through an outlet port when the control member is displaced in the direction of the outlet port; a plurality of pneumatic jets disposed about the chamber; and a plurality of pneumatic amplifiers disposed about the chamber, each pneumatic amplifier comprising a power stream of fluid, a plurality of channels through which the power streams can flow, including at least one outlet channel connected with one of said pneumatic jets, at least one alternate outlet channel, and pneumatic control means for selectively deflecting the power stream into either of said outlet channels, including a control stream of fluid which flows from an associated one of said outlet ports in the chamber wall to intersect said power stream and deflect from one of said outlet channels to the other, such that a slight displacement of the system displaces the control member to one side of the chamber where its surface substantially blocks the outlet ports on that side of the chamber to block the passage of air therethrough and stop the control stream of the pneumatic control means, whereby the power stream flows into one of said outlet channels.

References Cited
UNITED STATES PATENTS

| | | | |
|---|---|---|---|
| 1,518,892 | 12/1924 | Bates | 74—5.43 |
| 2,292,989 | 8/1942 | Carter | 74—5.43 |
| 2,368,058 | 1/1945 | Whatley | 74—5.43 |
| 2,916,918 | 12/1959 | Jones | 74—5.43 XR |
| 3,152,486 | 10/1964 | Jones | 74—5.43 |
| 3,362,233 | 1/1968 | Posingies | 74—5.43 XR |

FRED C. MATTERN, JR., Primary Examiner

MANUEL ANTONAKAS, Assistant Examiner

U.S. Cl. X.R.

74—58